US010855631B2

(12) United States Patent
Faitelson et al.

(10) Patent No.: US 10,855,631 B2
(45) Date of Patent: Dec. 1, 2020

(54) MANAGING A COLLABORATION OF OBJECTS VIA STUBS

(71) Applicant: VARONIS SYSTEMS INC., New York, NY (US)

(72) Inventors: Yakov Faitelson, New York, NY (US); Ophir Kretzer-Katzir, Tenafly, NJ (US); David Bass, Karmei Yosef (IL)

(73) Assignee: VARONIS SYSTEMS INC., New York, NY (US)

(*) Notice: Subject to any disclaimer, the term of this patent is extended or adjusted under 35 U.S.C. 154(b) by 29 days.

(21) Appl. No.: 16/365,697

(22) Filed: Mar. 27, 2019

(65) Prior Publication Data

US 2020/0314041 A1 Oct. 1, 2020

(51) Int. Cl.
*G06F 15/16* (2006.01)
*H04L 12/58* (2006.01)
*H04L 29/08* (2006.01)

(52) U.S. Cl.
CPC .......... *H04L 51/046* (2013.01); *H04L 67/06* (2013.01); *H04L 67/1097* (2013.01)

(58) Field of Classification Search
CPC .... H04L 67/06; H04L 67/1097; H04L 51/046

USPC ........................................................ 709/205
See application file for complete search history.

(56) References Cited

U.S. PATENT DOCUMENTS

| | | | |
|---|---|---|---|
| 9,164,850 B2 * | 10/2015 | Prahlad | G06Q 10/107 |
| 9,201,709 B2 * | 12/2015 | Momchilov | G06F 9/54 |
| 10,193,844 B1 | 1/2019 | Conley et al. | |
| 2013/0346978 A1 * | 12/2013 | Jiang | G06F 9/45558 718/1 |
| 2019/0034295 A1 * | 1/2019 | Bourgeois | G06F 11/1448 |

FOREIGN PATENT DOCUMENTS

EP 3285218 A1 2/2018

* cited by examiner

*Primary Examiner* — Frantz B Jean
(74) *Attorney, Agent, or Firm* — Soroker Agmon Nordman

(57) ABSTRACT

A computerized method for managing a collaboration of objects via stubs may include a computerized apparatus linked to a computerized system and configured to intercept an outgoing communication including an object, to identify an instance of the object in a storage of the computerized system, to generate a stub of the instance of the object specifying a location of the identified instance the object in the storage of the computerized device, to replace the object in the outgoing communication with the stub, and to send the outgoing communication including the stub to a recipient.

24 Claims, 6 Drawing Sheets

MANAGING A COLLABORATION OF OBJECTS VIA STUBS

FIELD OF THE DISCLOSURE

The present disclosure generally relates to file access management, and more specifically to managing a collaboration of objects via stubs.

SUMMARY

There is thus provided, in accordance with some embodiments of the present disclosure, a computerized method for managing a collaboration of objects via stubs, the method may include:
- by a computerized apparatus linked to a computerized system, intercepting an outgoing communication including an object;
- identifying an instance of the object in a storage of the computerized system;
- generating a stub of the instance of the object, wherein the stub comprises a link or a shortcut to a location of the identified instance of the object in the storage of the computerized device;
- replacing the object in the outgoing communication with the stub; and
- sending the outgoing communication including the stub to a recipient.

Furthermore, in accordance with some embodiments of the present disclosure, if upon verifying that there is no instance of the object stored in the storage, the method may include saving a copy of the object in the outgoing communication to the storage of the computerized system and generating a stub specifying a location of the saved copy of the object in the storage of the computerized system.

Furthermore, in accordance with some embodiments of the present disclosure, the method may include detecting an activation of the stub by the recipient, and enabling access by the recipient to the instance of the object in the storage of the computerized system if the recipient has access rights to access the object.

Furthermore, in accordance with some embodiments of the present disclosure, the method may include logging the activation of the stub by the recipient.

Furthermore, in accordance with some embodiments of the present disclosure, the computerized apparatus may include a communication interceptor. Intercepting the outgoing communication may include intercepting the outgoing communication using the communication interceptor.

Furthermore, in accordance with some embodiments of the present disclosure, the communication interceptor may be selected from the group consisting of a network sniffer, a packet sniffer, a packet analyzer, a communication gateway, a router, a communication switch, a communication monitor, and a communication protocol analyzer.

Furthermore, in accordance with some embodiments of the present disclosure, the computerized apparatus may include a server. Intercepting the outgoing communication may include intercepting the outgoing communication using the monitoring component implemented on the server.

Furthermore, in accordance with some embodiments of the present disclosure, the server may be a mail server, a conferencing server, a chat server, an instant messaging server, or a peer-to-peer messaging server.

Furthermore, in accordance with some embodiments of the present disclosure, the computerized apparatus may include a client device. Intercepting the outgoing communication may include intercepting the outgoing communication using a monitoring daemon implemented on the client device.

Furthermore, in accordance with some embodiments of the present disclosure, intercepting the outgoing communication may include intercepting file-access events in the storage of the computerized system and matching the intercepted events to file-sending events.

Furthermore, in accordance with some embodiments of the present disclosure, the method may include storing the stub in the storage of the computerized system.

Furthermore, in accordance with some embodiments of the present disclosure, the method may include storing metadata associated with the object in the storage.

There is further provided, in accordance with some embodiments of the present disclosure, a computerized system for managing a collaboration of objects via stubs may include a storage and a computerized apparatus. The computerized apparatus may be configured to intercept an outgoing communication including an object, to identify an instance of the object in a storage of the computerized system, to generate a stub of the instance of the object, wherein the stub comprises a link or a shortcut to a location of the identified instance of the object in the storage of the computerized device, to replace the object in the outgoing communication with the stub, and to send the outgoing communication including the stub to a recipient.

Furthermore, in accordance with some embodiments of the present disclosure, if upon verifying that there is no instance of the object stored in the storage, the computerized apparatus may be configured to save a copy of the object in the outgoing communication to the storage and generating a stub specifying a location of the saved copy of the object in the storage.

Furthermore, in accordance with some embodiments of the present disclosure, the computerized apparatus may be configured to detect an activation of the stub by the recipient, and to enable access by the recipient to the instance of the object in the storage if the recipient has access rights to access the object.

Furthermore, in accordance with some embodiments of the present disclosure, the computerized apparatus may be configured to log the activation of the stub by the recipient.

Furthermore, in accordance with some embodiments of the present disclosure, the computerized apparatus may include a communication interceptor for intercepting the outgoing communication.

Furthermore, in accordance with some embodiments of the present disclosure, the communication interceptor may be selected from the group consisting of a network sniffer, a packet sniffer, a packet analyzer, a communication gateway, a router, a communication switch, a communication monitor, and a communication protocol analyzer.

Furthermore, in accordance with some embodiments of the present disclosure, the computerized apparatus may include a server including a monitoring component configured to intercept the outgoing communication.

Furthermore, in accordance with some embodiments of the present disclosure, the server may be selected from the group consisting of a mail server, a conferencing server, a chat server, an instant messaging server, and a peer-to-peer messaging server.

Furthermore, in accordance with some embodiments of the present disclosure, the computerized apparatus may include a client device including a monitoring daemon configured to intercept the outgoing communication.

Furthermore, in accordance with some embodiments of the present disclosure, the computerized apparatus may be configured to intercept the outgoing communication by intercepting file-access events in the storage and matching the intercepted events to file-sending events.

Furthermore, in accordance with some embodiments of the present disclosure, the computerized apparatus may be configured to store the stub in the storage.

Furthermore, in accordance with some embodiments of the present disclosure, the computerized apparatus may be configured to store metadata associated with the object in the storage.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
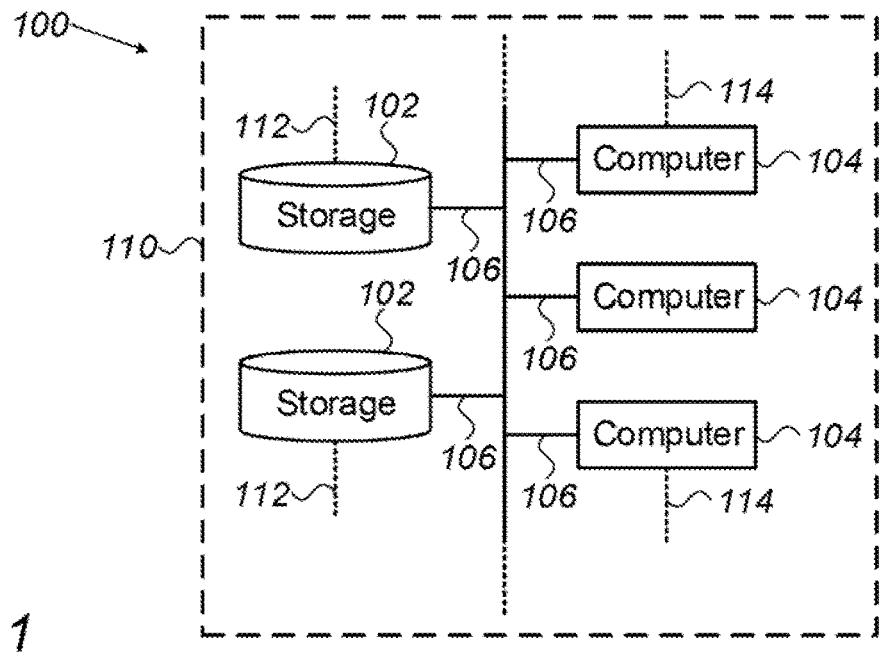

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2A:
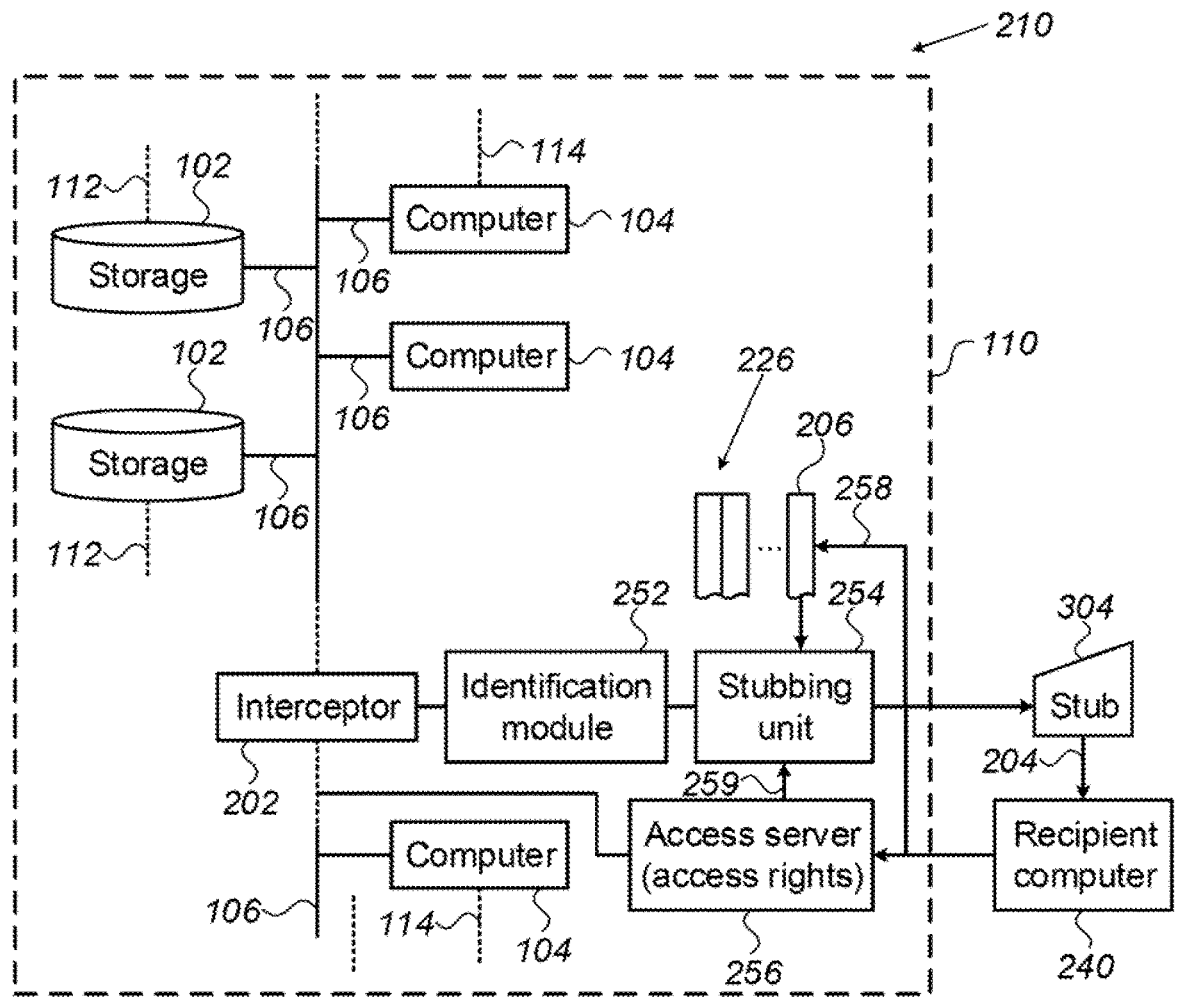
Figure 2B:
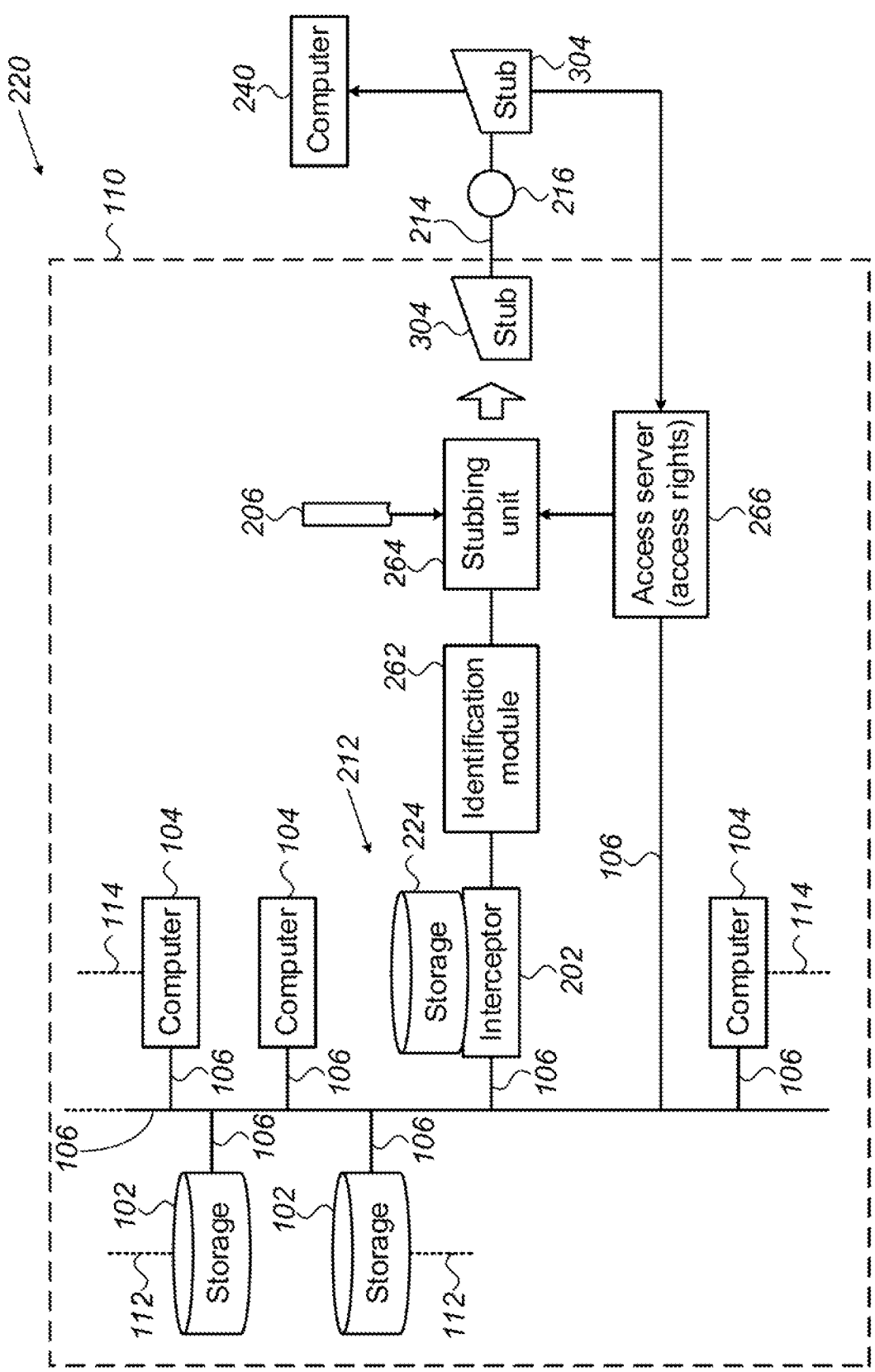

FIG. 1 schematically illustrates a computerized system of an enterprise system, illustrated as three computers representing any number of computers, according to exemplary embodiments of the disclosed subject matter;

FIG. 2A schematically illustrates a computerized system of an enterprise comprising a communication interceptor, according to exemplary embodiments of the disclosed subject matter;

FIG. 2B schematically illustrates a computerized system of an enterprise comprising a server having a port for external communication with a client device according to exemplary embodiments of the disclosed subject matter.

Figure 2C:
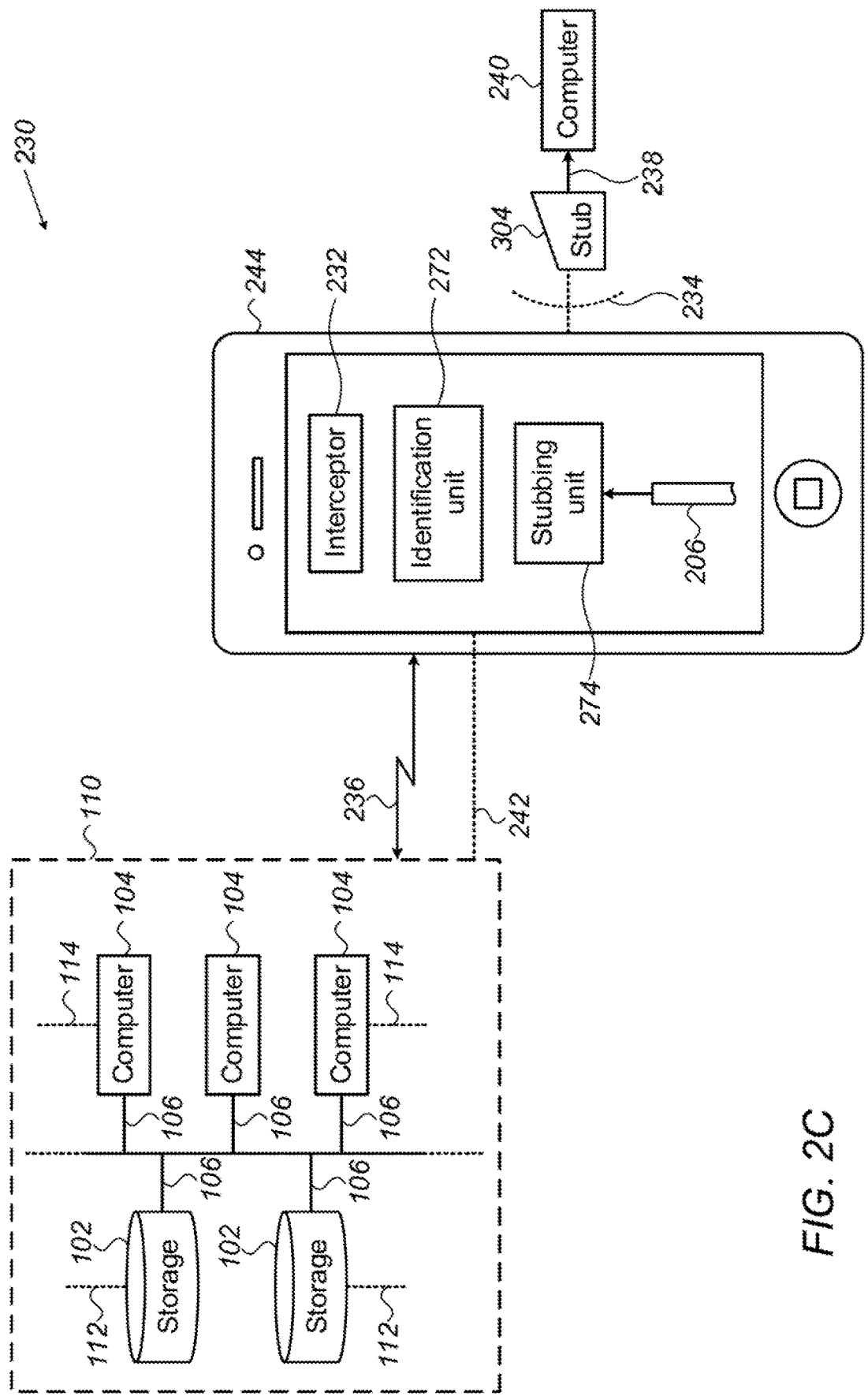

FIG. 2C schematically illustrates a variant system of a computerized system of an enterprise comprising a client device, according to exemplary embodiments of the disclosed subject matter.

Figure 3B:
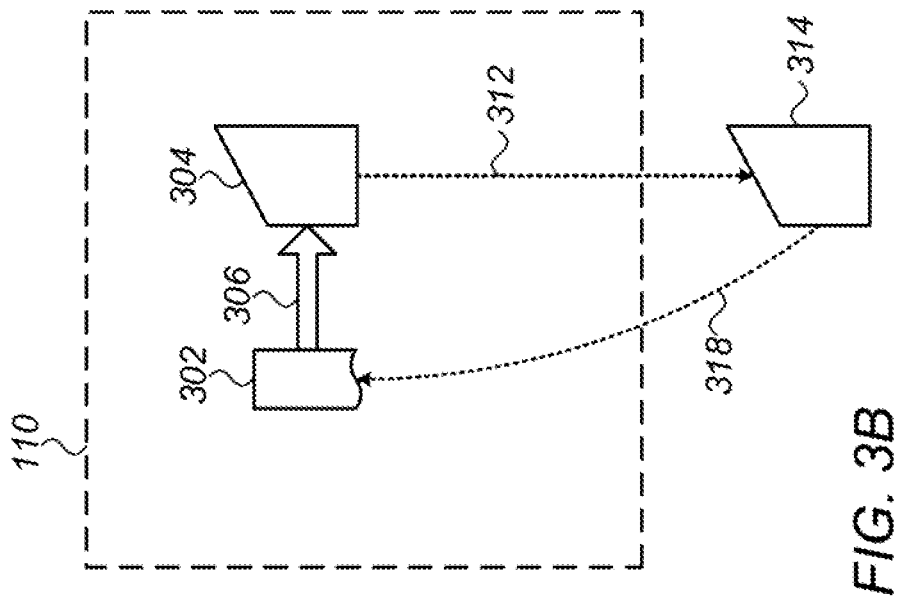
Figure 3A:
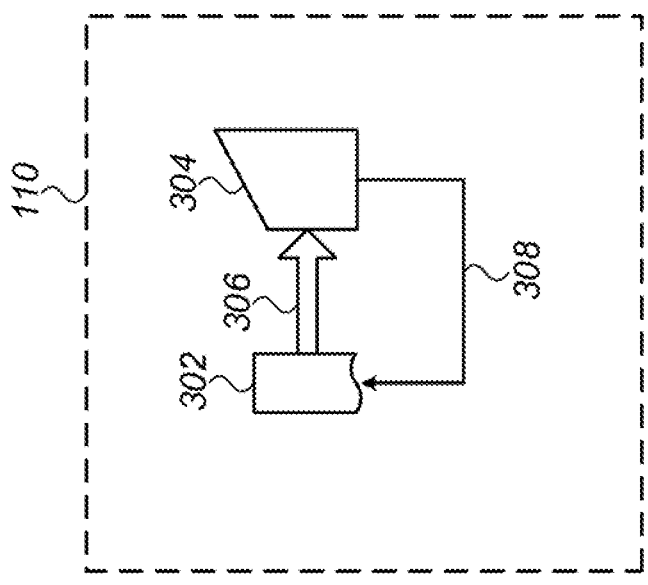
Figure 4A:
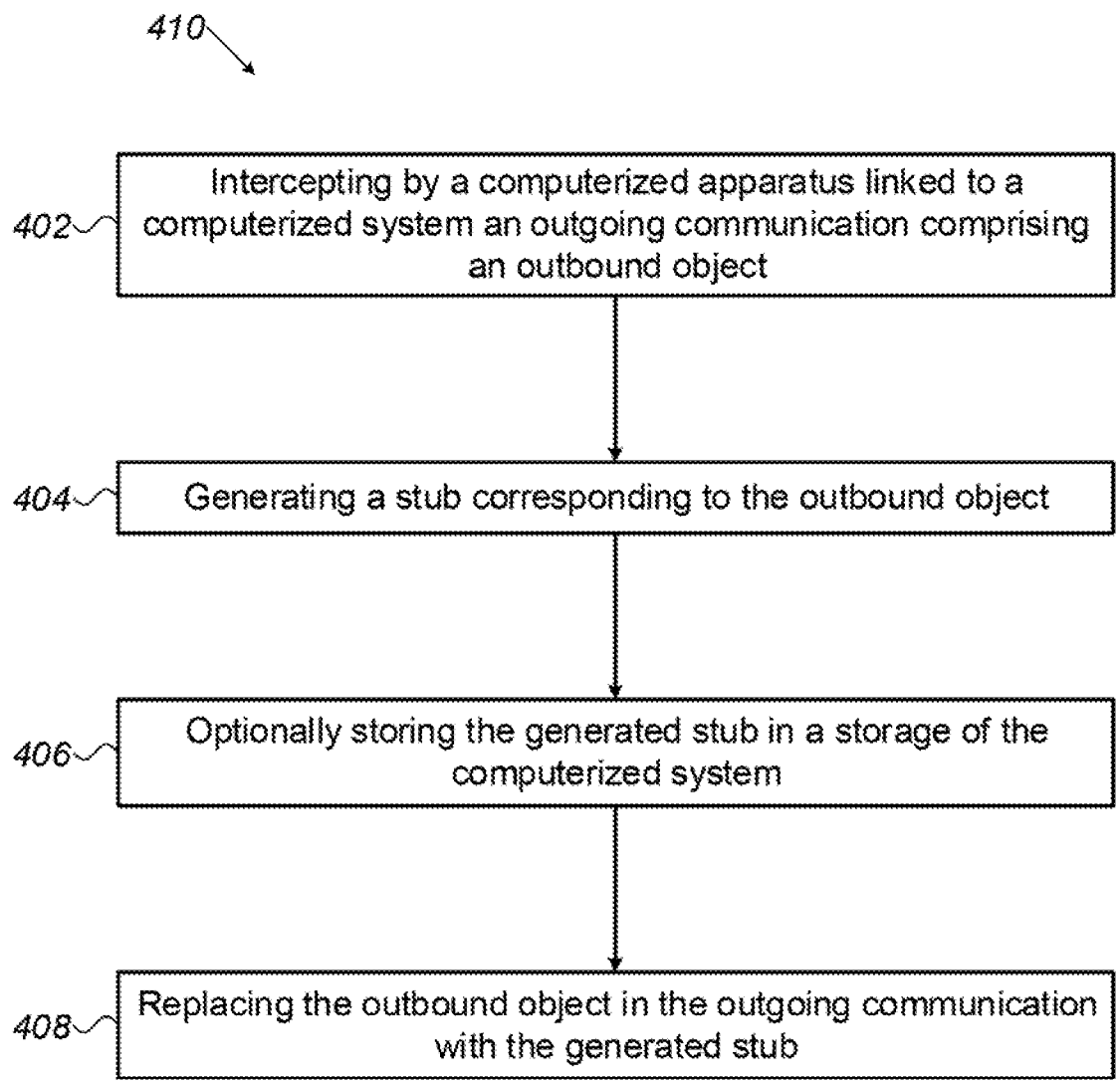
Figure 4B:
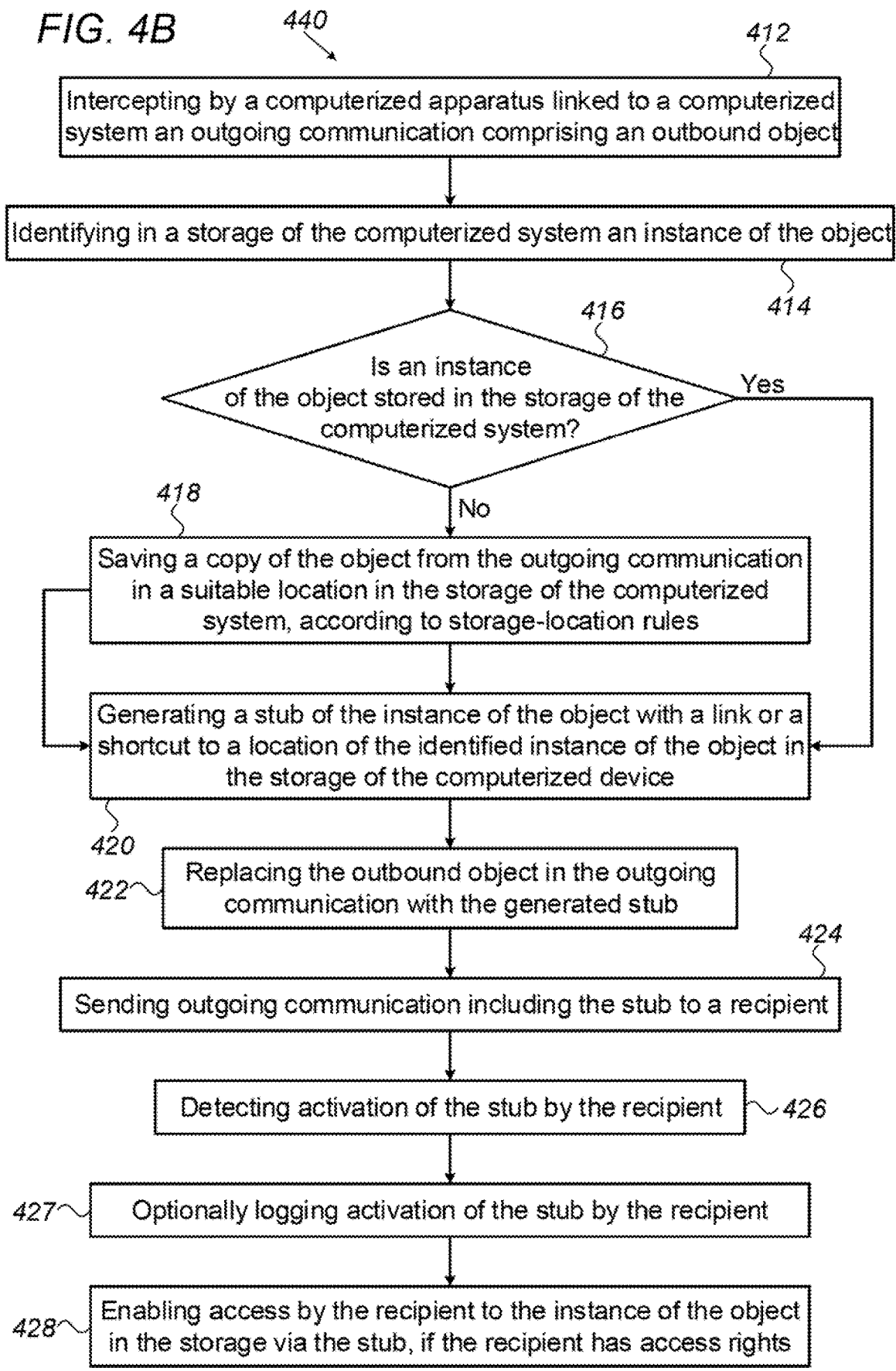

FIG. 3A schematically illustrates generation of a stub from an object and directly accessing the object via the stub, according to exemplary embodiments of the disclosed subject matter;

FIG. 3B schematically illustrates generation of a stub from an object and indirectly accessing the object via the stub, according to exemplary embodiments of the disclosed subject matter;

FIG. 4A outlines operations of a method for stubbing an object, according to exemplary embodiments of the disclosed subject matter; and FIG. 4B outlines operations of a method for enabling access to an object via a stub, according to exemplary embodiments of the disclosed subject matter.

DETAILED DESCRIPTION

In the context of the present disclosure, without limiting, the term 'data object' or 'object' implies a data construct, such as a folder, a file, a database, or a repository that is stored and/or is storable in storage apparatus. In the context of the present disclosure, without limiting, attributes or metadata of an object imply an at least one characteristic and/or property of the object such as permission to access the object by a user, content classification of the object, sensitivity or confidentiality of the object, type of the object and/or other metadata such as a creator of the object or an owner of objects, or tags or flags or notes regarding the object.

In the context of some embodiments of the present disclosure, without limiting, a 'stub' of an object implies a data entity and/or a construct that enables locating and/or detecting the object by linkage data to the object, such as by a link to the object, a URL, a pointer or a shortcut to the object. The object respective to the stub or corresponding to the stub is also referred to as a target object. Accordingly, the term 'to stub' implies to generate from an object a stub thereof. Generally, without limiting, the stub may comprise some auxiliary data elements in addition to linkage data for locating and/or detecting the object.

A target object may be accessed or accessing the target object may be attempted by or via a stub, such as, for example, accessing or opening a file by a pointer or a link thereto. Yet, it is noted that an attempt to access the target object is subject to possible conditions such as access privileges.

Accessing an object, e.g. a file or folder, may include applying operations to the object by a user, such as: updating and/or amending the content, metadata and/or any characteristic of at least a portion of the object, opening the object for viewing or reading, opening the object for writing and/or editing therein, deleting the object, sharing or collaborating the object with other users, copying the object, duplicating the object, etc.

For brevity, without limiting, the relation of a stub to a target object is referred to or considered as a link to the object.

Generally, a stub of an object is smaller than the object in terms of required memory and storage, optionally by orders of magnitude, since the stub basically includes linkage data to the object and possibly metadata relating to the object, rather than the data content of the object itself.

In the context of the present disclosure, without limiting, the term 'enterprise system' is directed to and/or implies a computerized system comprising a plurality of computers communicating therebetween and optionally with computers outside of the enterprise system, and having and/or sharing and/or communicating with a data storage comprising one or more data storage devices.

Generally, without limiting, an enterprise system comprises several computers, e.g., in a range between about 10 computers and about 1000 computers or more. Optionally, an enterprise system comprises less than 10 computers, not precluding having one computer as, for example, a mainframe computer.

Generally, without limiting, the one or more data storage devices store a large number of data objects that may be in the order of $10^5$-$10^6$ or higher. The large amount of the data objects calls for suitable management measures by the enterprise system regarding operations with and/or on the data objects such as with respect to security, confidentiality, permissions, privileges and restrictions for sharing and/or collaboration, collectively referred to also as supervision measures and/or supervision and/or security measures and/or or security of the enterprise system.

The enterprise system, at least in the apparatus aspect thereof, is also referred to as a 'computerized system', and the one or more data storage devices are referred to also as 'storage'. In referring to the enterprise system, without limiting, the computerized system is also implied.

For brevity, referring to an operation of and/or in the enterprise system, such as receiving data or setting permissions, implies an operation carried out by one or more components and/or computers of the enterprise system and/or by computers outside of the enterprise system such as by a remote computer linked to a computer of the enterprise system.

In the context of some embodiments of the present disclosure, without limiting, the term collaboratable implies a property or a quality of an object, indicating ability or capacity to participate in collaboration or a collaborated operation with one or more parties. Collaboration may be carried out by one or more parties accessing and/or updating and/or amending the content, metadata and/or any characteristic of at least a portion of the object.

In the context of some embodiments of the present disclosure, without limiting, collaboration with an object of and/or related to an enterprise system are performed by employees of the enterprise system within an enterprise system network, as well as employees of the enterprise system operating from a remote location outside of the network of the enterprise system. Optionally or additionally, collaboration with an object can be performed by parties external to the enterprise system who are not part of the enterprise system.

For brevity and unless otherwise specified, an object related to the enterprise system implies an object of the enterprise system, that is, stored in a storage unit associated with the enterprise system, and/or an object transferred to the enterprise system.

In the context of the present disclosure, without limiting, referring to a party implies a person of and/or communicating with the enterprise system and/or an entity such as a program operative on behalf thereof.

In the context of the present disclosure, without limiting, referring to a recipient implies a party to which data is communicated or sent and/or a party that receives and/or has received the data. In some embodiments, a recipient may be a party that is outside the enterprise system or computerized system, however, in some embodiments the described methods and apparatuses may be applicable to recipients residing within the enterprise system computerized system.

In the context of the present disclosure, without limiting, reference to corresponding objects implies similar or equivalent objects such as objects having identical file names or having identical metadata or having other identical or equivalent properties such as identical content or excerpts of content or checksum or hash values or any combination of the above.

In the context of the present disclosure, triggering or activation or invoking of a stub implies operating on a displayed stub or a representation thereof such as by a click or a double-click with a pointing device such as by a mouse or in case of a touch-screen by a click with a finger or a dedicated stylus, or by a selecting the stub or a representation thereof and activating it by pressing a key such as an 'Enter key', or by any other method such as sliding by a pointer of a pointing device or by a finger over the selection or by voice. Generally, without limiting, a representation of a stub is formed as an icon and/or a label. Optionally or additionally, activation of a stub is carried out programmatically where the stub or a representation thereof are not necessarily displayed or otherwise presented.

In the context of the present disclosure, without limiting, a stub is stored, held and/or accessible at a device, such as a computer of an enterprise system or a computerized device linkable and/or linked to the enterprise system, whereas a target object of the stub is stored in the storage of the enterprise system.

Consequent to activating the stub on the device, the device responds by attempting to access the target object. Provided the device or a party operating the device are privileged to access the target object, e.g. having suitable rights or permissions, the target object is accessed. For example, in case the target object is a document associated with a program, then the target object is opened by the program.

Attempting to access the target object is provided for by the construction of the stub with a linkage to the target object, akin to or as accessing a fle by a link or URL. Optionally or alternatively, the device is adapted or configured to attempt to access the target object.

It is noted that in addition to appropriate privileges, the target object may be accessed only if there is a suitable communication between the device and the storage of the enterprise system. For example, in case the stub resides on a cellular phone and the target object resides on a server or a computer of the enterprise system, then there must be a communication path therebetween such as WiFi or cellular communication for the target object to be accessed, such as opened, by activation of the stub. Optionally, in case there is no adequate communication, accessing the target object is queued or otherwise deferred, and responsive to establishing an adequate communication the access attempt is resumed.

In the context of the present disclosure, referring to an outbound communication or outgoing entity with respect to an apparatus implies an entity destined and/or designated to be sent or dispatched from the apparatus to a destination, wherein the apparatus may be a part of the enterprise system such as a computer thereof or the apparatus may be external to the enterprise system such as a remote computer linkable to the enterprise system, and wherein the destination is any device or equipment operable to receive entities such as messages and attachments comprising stubs and operable for activating a stub such as by a recipient of the destination. Such outbound communication may include an email with a document file attachment, a Multimedia Messaging Service (MMS) message or a instant message with a video or image file attachment, etc.

In the context of the present disclosure, without limiting and unless particularly specified, referring to a connection and/or a linkage between apparatuses implies a linkage therebetween by one or more electronically based communication techniques or facilities, including, without limiting, wired, wireless, cellular, satellite, and/or internet techniques or facilities.

The terms cited above denote also inflections and conjugates thereof.

In operating a computerized system, such as an enterprise system, some at least potentially problematic aspects are readily appreciated, including among others:

When files are sent out of the enterprise system, some or all security measures that might have been applicable are lost, thus risking breach of confidential information.

Files may be collaborated with parties both inside and outside the enterprise system, where at least outside the enterprise system the collaboration is regardless of permissions or other control measures so that restricted information might be divulged to unauthorized parties.

Copies and/or variants of files are uncontrollably sent or distributed to various locations, thus past and future control and tracking of the files might be lost or compromised without awareness what is the most up-to-date variant, and further storage capacity is superfluously or redundantly consumed.

Transfers of copies and variants of files adversely affect network and bandwidths utilization, resulting in excess communication which may be associated with slow network response as well as unwarranted expenses.

Thus, one technical problem dealt by the disclosed subject matter is exclusively directing reference to and collaboration with an object related to an enterprise system to an instance of the object in the enterprise system.

Another technical problem dealt by the disclosed subject matter is providing a secure collaboration with objects in the enterprise system under the supervision measures of the enterprise system. It is emphasized that the technical problem relates, at least practically, to ensuring that objects are not uncontrollably forwarded and/or delivered to parties such as parties collaborating with the objects, who do not have suitable access rights per the objects, whether these parties reside within or outside the enterprise system.

Yet another technical problem dealt with by the disclosed subject matter is reducing the amount of storage consumed by redundant replication of objects or variants thereof.

Further yet another technical problem dealt with by the disclosed subject matter is reducing the communication load and bandwidth expenditure when providing data such as files for collaboration. The disclosed subject matter is directed to reducing network traffic and storage, by sending stubs instead of outbound objects.

A technical solution according to the disclosed subject matter is intercepting attempts to collaborate an object related to the enterprise system by a party in communication with the enterprise system. For example, intercepting that a party of the enterprise system attempts to send a file such as a spreadsheet to a colleague via IM (instant messaging) service, or intercepting that another party in the enterprise system attempts to email a document to a colleague outside the enterprise system.

Responsive to intercepting a collaboration attempt of an object, the enterprise system storage may be searched to identify therein the instance of the object. If only one instance is identified in the enterprise system, such as a new object sent from the enterprise system, the only instance is considered as the most up-to-date object.

To identify or match a collaborated object with one or more instances of the object in the storage of objects of the enterprise system, a search may be conducted in the storage of the enterprise system.

Yet, the storage might be large with numerous objects therein, thus prohibiting sufficiently fast response such as real-time or practically real-time responses from the search.

Thus, in some embodiments or cases, the identification of objects, which may be performed by an identification module, is aided or relies on one more techniques to boost the response to real-time or with insignificant or immaterial delay.

The techniques may include, among others, the following:
A pre-created and continually updated index of objects of the enterprise system that comprises features of the object such as: contexts of the objects such as excerpts of the contents of the objects and/or attributes thereof such as file name and date and time of the object, identity of related owners or creators or modifiers of the object, and/or hashing of the objects for a quick-search.

In case of files being sent out of the enterprise system, intercepting file-access events in the enterprise system storage and matching the intercepted events to file-sending events, thereby the storage location of the original file that is being sent may be inferred.

In case of sending a file or an object out of the enterprise system, restricting the scope of a search to storage areas, such as folders, that are permitted to the party that sends or is operative in sending or attempting to send the file or the object.

In some embodiments, the search for an object is aimed for an exact match such as according to the name of the objects and/or metadata or attributes thereof. Optionally or alternatively, the search is aimed for similar instances of objects, where the similarity is defined by one or more rules or conditions provided in or by the enterprise system.

Instances of an object may be identified such as by metadata thereof, including, optionally, checksums or hashing or any suitable values of objects, as well as by attributes such as the object name or title. Multiple instance versions of the object as well as the most up-to-date instance of the object may be identified by metadata thereof such as date and time of recent amendments, or timestamps of the multiple instances.

It is noted that in case an outbound object is not present in the enterprise system storage, no matching can be performed. For example, the outbound object was generated by a party of the enterprise system remotely from the enterprise system, or the original object resides in non-accessible storage such as in an old archive, or the object is stored in a transient temporary location before properly or suitably stored such as when the object as a file was or is being edited and not yet finally saved. In such a case when the object is not present in the enterprise system storage then an automatic storage scheme, such as predefined or determined rules, is applied to direct the object to a location where a sent object would be stored once intercepted or received so that the object would be property stored in a known or a designated location. In some embodiments, the automatic storage scheme depends on metadata of the intercepted object such as owner, user permissions, classification, activity, etc.

Subsequent to the search and having found or identified an instance of the outbound object in the storage, the object is stubbed to form a stub of the object; namely, a construct is formed that includes access data to the instance object in the storage, such as a link, shortcut, pointer or URL (Uniform Resource Locator). Alternatively, in some embodiments, a search need not necessarily be performed. Instead, the outbound object may be automatically stored in a designated location in the enterprise system storage, and a corresponding stub may be generated accordingly.

Thereafter, when the enterprise system detects an attempt of communicating an object to a recipient, either from within or out of the enterprise system, the stub associated with the instance of the object is incorporated into the communication instead of the object; that is, the stub is sent to the recipient in lieu of the object per se.

Thus, provided having appropriate rights, the recipient can access via the stub the instance of the object corresponding to the stub, and collaboration with the object is channeled by the stub to instance of the object; that is to say, the recipient of the communication may access the instance of the object only indirectly, via the stub.

In some embodiments and/or generally, the interception of outbound objects and/or matching of an object with an instance of the object and/or replacements with stubs thereof is carried out by one or more processes of the enterprise system operating in the background such as responsive to events. The one or more processes are referred to also as background processing. The background processing operates transparently to senders and/or recipients of objects/ stubs and/or other parties of and/or associated and/or related to the enterprise system.

By way of example, a sender attaches an object to a message in IM, yet as resulting from the background processing the recipient would receive the message with an indication or a representation of the object such as an icon of the type of the object, where the indication is in fact a stub of the object rather than the object per se. From the sending and receiving parties' perspectives, using the stubs is just like ordinary experience with sending and receiving files or objects.

Accordingly, by way of the stub, collaborating parties, whether from within the enterprise system and/or from outside thereof, are provided access and for performing permitted tasks on the object that resides within the storage of the enterprise system. In case a recipient lacks the right permissions to access the object, he or she may ask for such permissions such as from an authorized party. Optionally, the request for permissions may be carried out automatically.

The instance of the object may undergo various modifications in content, metadata or other attributes such as security settings, the modifications may be made by any party accessing the object with appropriate modification permissions. Yet, a triggered stub will thus refer to the instance of the object regardless of whatever modifications were made to the object, and the supervision measures of the enterprise system would apply to the current metadata or other attributes of the object for deciding whether the object is collaborable with the party and under what provisions. Generally, according to policies of the enterprise system, changes to the target objects of the stubs would be recorded, such as in an audit trail, for future tracking or analysis or for any purpose.

In some embodiments, the stub may be temporarily or permanently saved, or it may be duplicated such that the stub duplicate may be saved in a temporary or permanent location on the enterprise system's storage unit.

It is emphasized that a stub is provided to or denied from a recipient of a communication according to the supervision measures of the enterprise system as directed or applied to the recipient, optionally according to time and/or geographical conditions.

A potential technical effect of the disclosed subject matter is a computerized system configured for supervised secured collaboration with objects indirectly and transparently of the users, via stubs.

Another potential technical effect of the disclosed subject matter is reducing communications load and bandwidth consumption in communicating with the enterprise system due to channeling access to objects via stubs that are smaller than the objects rather than sending the objects as, for example, access to objects may be deferred or timely distributed, thus avoiding communication peaks or bottlenecks.

Yet another potential technical effect of the disclosed subject matter is reducing storage required for corresponding or duplicate objects.

Further yet another potential effect is that communication messages including the stubs can be shared, such as forwarding to another party an email that includes a stub, the recipient will not be able to access the content of the target object of the stub unless permitted to access the object in the storage, thus imposing strict control on the target object's security.

Overview

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1 schematically illustrates, according to exemplary embodiments of the disclosed subject matter, a computerized system 100 of an enterprise system 110 represented schematically by a dotted frame, and illustrated as three instances of a computer 104, representing any number of computer 104, as indicated by dashed lines 114.

It is noted that computer 104 represents and/or may be any computerized apparatus. For example, a desktop computer, a portable computer such as a notebook computer or a laptop computer or a cellular phone or a tablet computer, or other computerized apparatus, for example, a wearable apparatus such as a cellular watch.

Computerized system 100 further comprises one or more data storage devices, illustrated as two instances of a data storage device 102, representing any number of data storage device 102, as indicated by dashed lines 112. Data storage device 102 generally stores objects or data entities such as files, folders, database records or user's definitions or similar elements, collectively referred to also as objects. Data storage device 102 optionally stored an index or part thereof of the objects and/or metadata of the objects.

The instances of computer 104 are connected, linked, or coupled therebetween and to the instances of data storage device 102, the connection or linkage illustrated and represented by a network 106.

Computerized system 100 is configured to exchange data with devices external to computerized system 100 by communications facilities comprised in the devices.

Generally, computerized system 100 and/or parts thereof are operable by one or more programs installed such as in instances of computer 104. For brevity, the one or more programs are also referred to as a system software.

Network Interception

FIG. 2A schematically illustrates a variant system 210 of computerized system 100 and enterprise system 110 comprising a communication interceptor, according to exemplary embodiments of the disclosed subject matter.

Communication interceptor 202 is installed in network 106 and is operative to intercept outgoing or outbound communications from enterprise system 110 in computerized system 210 to a recipient's computerized apparatus 240, as illustrated schematically by an arrow 204 representing the communication. The intercepted communication is analyzed and/or decoded to determine whether the communication comprises an attempt to send an object.

The object is illustrated schematically as an object 206 that is, at least in some cases, split or partitioned among a plurality of packets of the communication that are schematically illustrated as a plurality of a packet 226, where the dots between the packets denote any number of packets, not precluding a single packet. The intercepted communication is analyzed to determine whether the packets thereof include an outgoing object such as object 206.

Responsive to intercepting an outbound object. e.g., outbound object 206, enterprise system 110 is searched for or checked to find objects corresponding to the outbound object, such as by name of the object or checksum or any information that is common and/or similar to corresponding objects, for example, by hash values. In some embodiments, enterprise system 110 may be searched for or checked to find objects corresponding to the outbound object by an identification module 252. The identification module 252 is installed in the computerized system 210 and is configured for identifying in the storage (e.g., storage 102 and/or storage 112) of the computerized system 210 an instance of the object related to the outbound object, e.g., outbound object 206.

In some embodiments, in case one or more corresponding objects may be found, the most up-to-date object may be selected among the corresponding objects, including the outbound object, as a candidate object for collaboration with the one or more recipients, e.g., via recipient's computer 240. In other embodiments, in case the most up-to-date object is found in an archive or backup repository or other repositories such as in removable media according to catalog thereof, the most up-to-date object may be moved and/or copied to a suitable storage of the enterprise system as a candidate object for collaboration.

The candidate object is then stubbed by stubbing unit 254, thereby generating a stub of the candidate object so that the candidate object is the target object of the stub. The stub, e.g., stub 304, is generated as a data construct that includes data for locating the target object, such as a link thereto, a path, a pointer or an address thereof.

Generally, without limiting, the stub may be stored in enterprise system 110, e.g. by stubbing unit 254, and may be named based on the target object thereof, such as with an identical name, possibly also a variation such as a suffix and/or prefix to indicate that a stub is involved rather than a representation of the target object per se. Further generally, the stub may be represented and/or presented as the target object itself possibly with naming variation. Optionally or alternatively, the stub is represented and/or presented with an icon that is generally associated with the target object, possibly with an indication such as an overlay to denote that the representation is a stub. Optionally or alternatively, the stub is represented and/or presented with a different icon relative to an icon associated with the target object.

The stub 304 provides for access to the corresponding target object for collaboration directly in enterprise system 110 such as in storage of enterprise system 110 and/or via in an instance of computer 104, possibly through a network such as network 106.

Thereafter, stub 304 may be activated or triggered, such as by a recipient of stub 304 or by a party having access to stub 304 and wishing to collaborate with the target object of stub 34. Consequently, the target object would become accessible to the recipient computer 240 and/or opened by the recipient computer 240, provided there is no impediment to that effect such as security or supervision measures of enterprise system 110. Yet, however, consequent to triggering or attempting to activate stub 304, the supervision measures of enterprise system 110 are applied, such as responsively to an event driven program configured in computerized system 210 that senses the triggering or attempts to open stubs. The supervision measures of enterprise system 110 check whether target object 206 is allowed for collaboration with a party, such as a party triggering stub 304 (e.g., recipient computer 240), and possibly under what restrictions or circumstances.

Access server 256 may be in communication with enterprise system 110 via network 106, and may be configured to detect activation or triggering of stub 304. Access server 256 may further be configured to log such activation or triggering of stub 304 (e.g., in a log file stored in the computerized system), and may enable access to the target object assuming the recipient of stub 304 is assigned with proper access rights. Access server 256 may be in communication with stubbing module 256, thus being able to detect the target object that stub 304 corresponds to and to access the object and/or related metadata corresponding thereto. In some embodiments, access rights may be stored within access server 256, whereas in other embodiments, access server 256 may have access to the access rights, which may be stored on a different server, within enterprise system 110 or outside while in communication with enterprise system 110. It is noted that in some embodiments, stubbing unit 254 and access server 256 may be implemented as a single module or unit.

In some embodiments, access server 256 may be configured to log activation or triggering of the stub, e.g., stub 304. Such logging may include details relating to one or more recipients of the stub, time and date of activation or triggering, the authorizations of the recipient of stub 304, and which recipients have authorization to access stub 304.

In case target object 206 is allowed for collaboration, such as with the party that has triggered stub 304, the target object is opened and/or becomes accessible to the recipient of the stub, via stub 304 (as illustrated schematically by arrows 258, 259 representing accessibility to the target object 206 via the stub either directly or optionally via stubbing unit 254), and the party may access the target object, possibly under some restrictions such as an allowed period or within certain dates and/or time ranges. Otherwise, in case the party is prohibited to collaborate with the target object, the target object is not opened, optionally with a message or an alert notifying the party to that effect.

It is noted that in some embodiments, in case the target object 206 was altered after the stub has been generated by stubbing unit 254, the object is implicitly accessible by the stub due to the very nature of the stub, namely, by the linkage of the stub to the object at the location of the instance of the object in the storage of enterprise system 110 from the intercepted outbound communication. It is noted that the object might be altered with respect to contents thereof and/or metadata thereof and/or other attributes or settings thereof such as security or permissions settings thereof, yet, however, the stub relates to the object even if possibly altered in the storage location.

It is further noted that in case an object associated with a stub is moved to another storage location, in some embodiments at least, computerized system 210 is configured by a mechanism that updates the stub according to the new location of the target object. For example, by an event-driven program configured in computerized system 210 that responds to the event of moving a stubbed object by updating data related to the stub, e.g. location data and/or metadata stored by access server 256 and/or by stubbing unit 254.

Further, in some embodiments, before and/or responsive to attempting to access a stub, the validity of the stub as for the linkage thereof to the object is checked, e.g. by access server 256 and/or by stubbing unit 254, and in case a problem is encountered, such as linkage to mismatching objects or missing objects, then the party and/or the apparatus that attempted invoking the stub are notified to that effect, e.g., by access server 256. The validity is checked, for example, in computerized system 210 by a program and/or extension of the file system to detect an incorrect or a corrupt target object and/or to detect inconsistent or wrong access linkage such as by the auxiliary data elements of the stub. In some embodiments, validity of the stub may be checked by access server 256.

In some embodiments, the stub may be configured such to disable the recipient from storing the stub and/or its corresponding object in the recipients computer, in order to avoid collaboration of the stub or its corresponding object with any other recipient who may not have the appropriate access rights.

In some embodiments, when the target object of an invoked stub is not found, the corresponding most up-to-date object may be searched for and possibly identified in computerized system 210 such as by a program and/or extension of the file system, or by access server 256 and/or by stubbing unit 254. Thus, responsive to detecting an incorrect target object and/or inconsistent access, a search for the corresponding most up-to-date object is initiated according to, for instance, the linkage data and/or the auxiliary data elements of the stub. Optionally, when a target object was identified anew, such as by a search, the corresponding stub or stubs are updated accordingly in a storage unit of the enterprise system, at least those stubs that are currently accessible such as the stub that was invoked for that target object.

Communication interceptor 202 may be implemented as or according to a network sniffer or packet sniffer or packet analyzer.

It is noted, however, that communication interceptor 202 may be implemented in any suitable manner for intercepting an outbound object from enterprise system 110, including possibly custom hardware and/or software operable with a suitable hardware such as an electronic apparatus. For example, communication interceptor 202 may be implemented as and/or effectively as a communication gateway, a router, a communication switch, a communication monitor, or a communication protocol analyzer.

It is further noted that by applying the supervision measures of the enterprise system access to the target objects via the corresponding stubs, the objects are secured in the enterprise system, for example, the target objects cannot be distributed freely to devices and/or parties.

It is yet further noted that by applying the supervision measures of the enterprise system an access trail and/or audit trail and/or other data constructs may be generated and/or updated responsive to stubbing and/or accesses and/or attempts to access objects via the stubs, thus reflecting activities related to the objects and/or stubs.

In some embodiments, once a stub is provided to a recipient and/or recipients, the stub is discarded. In other embodiments, the stub is discarded only following its activation by the recipient, such to enable access to the object in the storage via the stub.

Server Interception

FIG. 2B schematically illustrates a variant system 220 of computerized system 100 and enterprise system 110, comprising a server 212 having a network 214 with a port 216 for external communication, the port illustrated schematically as a circle, according to exemplary embodiments of the disclosed subject matter.

Server 212 may operate with data storage device 102 and/or with a dedicated storage apparatus denoted as server storage 224, representing any storage operative with server 212.

Server 212 may be a part of enterprise system 110 and/or of computerized system 220. Optionally or additionally, server 212 may comprise and/or be implemented as and/or effectively as a manager or server of a communication system such as Microsoft Exchange (Micrsoft Corporation), Skype (Skype Technologies S.A. (Microsoft Corporation)) or other instant messaging (IM) systems. Optionally or additionally, server 212 may comprise and/or be implemented as and/or effectively for a peer-to-peer (p2p) communication system. In some embodiments, server 212 and/or server storage 224 are located outside of computerized system 220, at least partially, and linked to computerized system 220 by a network such as network 106.

Server 212 is equipped or configured with a monitoring or intercepting component 222 operative to detect and/or intercept an outgoing object, represented as object 206, which may be outbound from server 212 via network 214.

In some embodiments, monitoring component 222 comprises hardware and/or software operable with a suitable hardware such as an electronic apparatus that is configured to intercept objects outbound from server storage 224. Optionally, in some embodiments, monitoring component 222 is implemented on server 212 as or effectively as communication interceptor 202 (FIG. 2A). Further optionally, in some embodiments, monitoring component 222 is implemented as or effectively as communication interceptor 202 installed on network 214 as monitoring component 222 is installed on network 106.

In some embodiments monitoring component 222 is constructed and/or configured as an extension of a vendor-provided software and/or hardware. For example, Microsoft Exchange may be extended by API (application programming interface) to enable the operation of monitoring component 222, or by a software agent and/or daemon or background process operative in conjunction with Microsoft Exchange.

The operations and supervision measures described above for variant system 210 responsive to intercepting of object 206, stubbing object 206 with a corresponding stub 304, and sending the stub to a recipient computer 240 are carried out effectively and/or equivalently also responsive to intercepting object 206 in variant system 220.

Variant system 220 may comprise an identification module 262 (similar to identification module 252 variant system 210). Identification module 262 is configured to search for relevant objects and identify the instances of objects that correspond to the outbound object, for example based on matching metadata, matching names of objects, or other attributes associated with the object. Identification module 262 may carry out such procedures by one or more software modules and/or components and/or sub-systems, e.g. implemented in access server 256 and/or by stubbing unit 254.

System 220 may further comprise a stubbing unit 264 that is configured to generate a stub corresponding to the outbound object. That is, stubbing unit 264 generates a stub 304 corresponding to outbound object 206. The stub 304 is then transferred via port 216 externally to system 220, and outside enterprise system 110 to a recipient computer 240. Once the recipient triggers stub 304, e.g., tries to access the target object via stub 304, access server 266 may enable or disable access by the recipient to the target object via stub 304, according to access permissions (or lack of such) that were pre-assigned to recipient computer 240. Access server 266 may be in communication with enterprise system 110 via network 106.

Dispatch Interception

FIG. 2C schematically illustrates a variant system 230 of computerized system 100 and enterprise system 110, comprising a client device 244, according to exemplary embodiments of the disclosed subject matter.

Client device 244, illustrated schematically as a contemporary cellular smart phone, may be any computerized apparatus. For example, a desktop computer, a portable computer such as a notebook computer or a laptop computer or a cellular smart phone or a tablet computer or a smart wearable apparatus such as a cellular watch, or other computerized apparatus, for example, a mainframe computer with a terminal connected thereto. Client device 244 represents any number of instances of client device 244, possibly of various apparatuses or equipment. In some embodiments, client device 244 may be an enterprise system computer, e.g. computer 104.

Client device 244 belongs and/or is otherwise associated and/or affiliated with enterprise system 110 such as being operated with or by a party of enterprise system 110 and/or otherwise associated with enterprise system 110. Client device 244 is connected and/or connectable and/or linked and/or linkable to computerized system 230 of enterprise system 110 via a network that is schematically illustrated as a client network 236. Client network 236 comprises and/or may comprise any configuration and/or combination of network technologies and routs, for example, wired and/or wireless and/or cellular, not precluding satellite communications. In some embodiments or cases, client network 236 is connected or linked to network 106 such as an extension thereof.

Client device 244 comprises and/or may comprise further networking and/or communication facilities, such as a cellular communication or a wireless communication, schematically illustrated as antenna 234, that are capable to transfer a stub 304 corresponding to an object, such as object 206, to various destinations such as another instance of client device 244, e.g., recipient computer 240, as schematically illustrated by an arrow 238. In some embodiments, client device 244 is located outside of enterprise system 110 and/or computerized system 100 as illustrated in variant system 230. Optionally or alternatively, in some embodiments, client device 244 is located inside enterprise system 110 and/or computerized system 100, for example as computer 104. It is noted that in case client device 244 is internal to enterprise system 110 and/or computerized system 100 as illustrated in variant system 230, the networking and/or communication facilities represented by antenna 234 may be implemented in network 106 and/or an extension thereof.

Client device 244 is configured with a software and/or hardware component as an agent or a daemon operative with the software within and/or in conjunction with hardware and/or firmware of client device 244, and is designed and constructed to intercept objects outbound from client device 244, illustrated schematically as an intercepting daemon 232. The outbound objects are intended for one or more recipients or one or more destinations such as apparatuses of recipients, collectively referred to as an outbound participant.

In some embodiments, intercepting daemon 232 is installed and/or configured in client device 244 by computerized system 230 of enterprise system 110 via client network 236. Optionally or alternatively, intercepting daemon 232 is installed and/or configured in client device 244 by computerized system 230 of enterprise system 110 via another link, schematically illustrated as a link 242. Optionally or alternatively, intercepting daemon 232 is installed and/or configured in client device 244 by other methods such as by a wireless connection or a USB storage device or appliance. It is noted that in case intercepting daemon 232 comprises hardware elements and/or a hardware connection to the hardware of client device 244 then client device 244 is tinkered with or amended to integrate intercepting daemon 232 therein.

In some embodiments, intercepting daemon 232, or a component or components to this effect, is constructed in computerized system 230 and/or an apparatus linked with computerized system 230 is operative to remotely control client device 244, such as via client network 236, at least for intercepting outbound objects from client device 240. Optionally or alternatively, a part of intercepting daemon 232, or a component to this effect, is partly constructed in computerized system 230 and/or an apparatus linked with computerized system 230 and partly in client device 244.

In the following description, for brevity and without limiting or unless otherwise specified, an intercepting daemon 232 as configured in client device 244 is referred to, without precluding as corresponding to remote operations and/or partially remote operations in or from computerized system 230.

In some embodiments, responsive to intercepting an outbound object by intercepting daemon 232, such as via client network 236, searches in computerized system 230 take place in order to find objects corresponding to the outbound object 206, such as by name of the object or any information that is common and/or similar to corresponding objects, for example, by metadata thereof.

In some embodiments, intercepting daemon 232 may comprise an identification unit 272 and/or a stubbing unit 274. In other embodiments, identification unit 272 and/or stubbing unit 274 may be installed and/or configured in client device 244 by computerized system 230 of enterprise system 110 via client network 236. The searches for instances of the object corresponding to the outbound object may be performed by identification unit 272, which may include software and/or hardware incorporated within client device 244 and configured to perform the searches. In other embodiments, identification unit 272 may be incorporated within enterprise system 110, external to client device 244, and may, for example, be triggered upon a command sent by intercepting daemon 232 via client network 236.

The candidate object is then stubbed. e.g. by stubbing unit 274, which may or may not be incorporated within client device 244, thus generating a stub of the candidate object as the target object of the stub by forming or constructing linkage data to instances of the object. Thereafter, the stub, e.g., stub 304 is sent instead of the outbound object 206, and may be activated or triggered, such as by a recipient, e.g., recipient computer 240 that might wish to collaborate with the target object of the stub. Consequently, the target object corresponding to stub 304 would become remotely accessible to the recipient, yet under or subject to the security or supervision measures of enterprise system 110.

In some embodiments, instead of identification unit 272 and stubbing unit 274 performing the search for an object and stubbing thereof, intercepting daemon 232 sends, such as via client network 236, a request to computerized system 230 to perform a service of searching and stubbing, generally along with necessary information about the outbound object such as about object 206. In such cases, a stubbing unit may be provided in enterprise system 110 or computerized system 230. Responsively, computerized system 230 provides client device 244 with the stub, e.g., stub 304 to be provided to the recipient party, e.g., recipient computer 240.

In some embodiments, a variation of the above may be performed. For example, responsive to a request from intercepting daemon 232 to computerized system 230, the latter sends to intercepting daemon 232 a link to the object according to which intercepting daemon 232 generates a stub to be provided to the recipient.

Thus, by using intercepting daemon 232, stubbing unit 274 and/or identification unit 272 and/or other components to this effect such as in computerized system 230, in lieu of dispatching to the recipient an object, such as object 206, a stub 304 to the outbound or target object is dispatched.

It is noted that client device 244 is not necessarily always linked with enterprise system 110 and/or of variant 230 of computerized system 100, and, optionally, in case object-related data or metadata is to be provided to client device 244, the object-related data or metadata may be cached or held until client device 244 links with enterprise system 110 and/or of computerized system 100.

Other aspects regarding the outbound objects and corresponding stubs thereof described above with respect to variant system 210 are applicable for variant system 230, at least partially. For example, by identification unit 272 accessing computerized system 100 and/or requesting a service therefrom, in case the object is found in an archive or backup repository or other repositories such as in removable media, the object may be moved and/or copied to a suitable storage of enterprise system 110 and/or of computerized system 100 as a candidate object for collaboration.

In some embodiments, communication interceptor 202 and/or monitoring component 222 and/or intercepting daemon 232 are collectively also referred to as an intercepting component or an interceptor, and are operative with and/or controlled by a software module and/or a component and/or a sub-system installed in computerized system 100 such as in one or more instances of computer 104 and/or in recipient/client device 240 and/or client device 244. Optionally, in some embodiments, communication interceptor 202 and/or monitoring component 222 and/or intercepting daemon 232 are implemented based on electronic circuitry or other electronic equipment in one or more instances of computer 104 and/or intercepting daemon 232, such as I/O ports, interrupt controllers or network controllers.

In some embodiments, the communication interceptor 202 and/or monitoring component 22 and/or intercepting daemon 232 may be or may comprise a communication server. In some embodiments, the communication server may be a mail server. In some embodiments, the communication server may comprise a conferencing server, an instant messaging server or a peer-to-peer messaging server.

In some embodiments, searching for corresponding objects and identifying instances of objects are carried out, respectively, by one or more software modules and/or components and/or sub-systems, referred to also as an identification unit or module, which may include hardware and/or software which may be incorporated into or installed in computerized system 100 such as in one or more instances of computer 104 and/or intercepting daemon 232. In some embodiments, the intercepting component or an interceptor may comprise or may be associated with an identification unit, e.g. identification unit 252, 262 or 272.

In some embodiments, stubbing of objects are carried out by a software module and/or a component and/or a sub-system, referred to also as a stubbing unit, installed in computerized system 100 and/or recipient/client device 240 and/or 244, such as in one or more instances of computer 104 and/or intercepting daemon 232. In some embodiments, the intercepting component or an interceptor may comprise or may be associated with a stubbing unit, e.g. stubbing unit 254, 264 and/or 274.

The units, modules and/or components and/or sub-systems may be separate entities in computerized system 100, and/or may be combined at least partially and/or may be incorporated in the system software.

In some embodiments, one or more other software modules and/or components and/or sub-systems are installed in computerized system 100 and/or intercepting daemon 232 for operating on objects and/or stubs and/or other entities.

It is noted that, at least in some embodiments, the instance of an object is stubbed just prior to communicating thereof rather than stubbing beforehand regardless of the communication. Optionally the instance of an object is stubbed according to determinations applied in computerized system 100, such as by a program installed in computerized system 100.

In some embodiments, objects are stored in storage of computerized system 100 in one or more designated locations. Optionally, the designated locations are determined by one or more storage-location rules constructed in computerized system 100. For example, the rules determine the designated locations for objects according to metadata data thereof, such as file names of the objects, dates and times the stubs of the respective objects were sent, or by date and time of the stubs or by classification of the objects, or by the location in which the non-updated object was stored, or by a temporary location, or by the sender of the stubs or the recipient of the stubs and/or by any other data such as by contents of the objects respective to the stubs.

It is further noted that an outbound object and accordingly an outbound stub may be sent out by any scheme or protocol, whether in an original or industrial and/or state of the art and whether an adapted one for specific goals such as with respect to the disclosed subject matter. For example, SMTP, FTP, HTTP, IM, SMS or any other scheme or protocol such as WhatsApp (WhatsApp Inc.).

An exemplary scenario for illustrating operation of enterprise system 110 with computerized system 100 and client device 240 according to the disclosed subject matter is delineated briefly below.

A sender as a party incorporates or attaches an object in an outbound email message addressed to a recipient such as in the 'To' or 'cc' field of the message.

The message attempted to be sent is intercepted and the object is extracted. The enterprise system is searched for or checked to find instances of the object from objects corresponding to the extracted object.

Subsequently, a stub of the object is sent as an attachment to the recipient who may trigger the stub, thereby accessing the target object of the stub in the enterprise system as the object for collaboration with the sender and the recipient and possibly also with other parties.

It is noted that after the stub was sent to the recipient the target object may have been modified. Nevertheless, the stub is directed to the object. Likewise, in case the recipient triggers the stub after one or more time intervals, where possibly the target object was further modified, still the stub is directed to the object such as discussed above.

It is also noted that accessing the target object is according to the supervision measures of the enterprise system. For example, in one case, responsive to triggering the stub the target object was accessible to the recipient, yet, in subsequent triggering the object might be blocked for the recipient such as due to modified supervision measures of the enterprise system respective to the target object and/or the recipient.

In some embodiments, the recipient may send or otherwise transfer the stub to a fourth party for collaboration with, and the fourth party may trigger and access the target object as described above, in accordance with the supervision measures of the enterprise system.

It is noted that the recipient triggers the stub in a device such as a computer or a telephone or a tablet remote from the enterprise system.

FIG. 3A schematically illustrates generating in enterprise system 110 a stub 304 from an object 302 and directly accessing the object 302 by stub 304 in enterprise system 110, according to exemplary embodiments of the disclosed subject matter.

In some embodiments, object 302 represents the instance of any corresponding objects in the enterprise system 110.

As schematically illustrated by an arrow 306, stub 304 is generated in enterprise system 110 from object 302.

As schematically illustrated by an arrow 308, stub 304 facilities access to object 302 directly in enterprise system 110. For example, by triggering or activation of stub 304, access to object 302 is enabled.

FIG. 3B schematically illustrates generation in enterprise system 110 of a stub 304 from an object 302 and indirectly accessing the object by a duplicate stub 314 of stub 304 in enterprise system 110, according to exemplary embodiments of the disclosed subject matter.

In some embodiments, object 302 represents the instance of any corresponding objects in the enterprise system 110.

As schematically illustrated by an arrow 306, stub 304 is generated for object 302.

As schematically illustrated by an arrow 312, duplicate stub 314 of stub 304 is transferred outside of enterprise system 110, for example, by sending stub 304 to a device remote from enterprise system 110.

Thus, as schematically illustrated by an arrow 318, duplicate stub 314 facilities access to object 302 in enterprise system 110 indirectly from outside of enterprise system 110. For example, duplicate stub 314 is sent as an email attachment to a collaborative party which may remotely access object 302 by triggering or activation of duplicate stub 314, subject to security measures of the enterprise system, if applicable.

That is, in some embodiments, a stub may be directly sent to a recipient who is located within the enterprise system, whereas a duplicate stub may be sent to a recipient who is outside the enterprise system. In other embodiments, either a stub or a duplicate stub may be sent to a recipient regardless of the recipient being within or outside the enterprise system.

In some embodiments, duplicate stub 314 of stub 304 represents and/or constitutes stub 304 rather than a duplicate thereof.

Generally, without limiting, a stub received by a first recipient may be forwarded or sent to a second recipient or a second party, and the stub is operative by the second recipient or second party as by the first recipient, subject to suitable access rights. Likewise, the second recipient or second party may forward or send the stub to other recipients or parties, and the stub is operative by the other recipients as by the first recipient (assuming the other recipients also have proper access rights).

It is emphasized that a stub of an object is an auxiliary construct and is of a virtual or transitory nature at least with respect to a target object thereof. The subsistence of a stub may be within an outbound communication and/or related data such as sent messages. However, in some embodiments, a stub may also be used in communication within the enterprise system, in order to reduce network consumption and optionally provide additional advantages such as determining the object to be sent to a recipient residing within the enterprise system or affiliated with the enterprise system.

FIG. 4A outlines operations 410 for stubbing an object, according to exemplary embodiments of the disclosed subject matter.

In operation 402 an outgoing or outbound communication comprising an outbound object is intercepted by a computerized apparatus linked to a computerized system.

Generally, the interception is carried out responsive to events or occurrences related to communications of objects of the computerized system. The interception is carried out by hardware and/or software operating in conjunction with the hardware, such as communication interceptor 202, monitoring component 222 or intercepting daemon 232 described above.

The outbound object is an object of the computerized system, or to that effect, a copy of the respective object, as or akin to attachments in emails or attachments to chat messages as known in the art.

In operation 404 a stub that corresponds to the outbound object is generated. The stub may be generated by a stubbing unit, (e.g. stubbing unit 254, 264, or 274) which may be a stand-alone module or may be incorporated within the intercepting component, e.g., within communication interceptor 202, monitoring component 222 or intercepting daemon 232.

In operation 406, the generated stub may be optionally stored in a storage of the computerized system or enterprise system, e.g. along with related data or metadata which may be associated with the stub and/or with the target object or the outbound object.

In operation 408, the outbound object in the outgoing or outbound communication is replaced with the generated stub, which corresponds to the outbound object. Thus, the outbound communication delivers or sends the stub to a recipient or a destination device instead of sending or delivering the object that was initially comprised as part of the communication.

In one embodiment, the stub generated is directed, by linkage data thereof, to the outbound object or a copy thereof to that effect.

If an identification process of a suitable object corresponding to the outbound object is applied, the generated stub may be directed to the suitable object whether as originally outbound or as amended or as determined or as identified, e.g. by an identification unit such as unit 252, 262, 272. In some embodiments, an initial stub may be generated corresponding to the original outbound object, and data relating to the stub may be updated, e.g. after the stub was sent to the recipient of the outgoing communication, such as responsive to modifications applied to the outbound object or instances thereof or a suitable object identified to represent or correspond to the outbound object.

The outbound object or a copy thereof or an object representing the outbound object may be accessed via the stub according to the linkage data of the stub. In the above example, linkage data indicating which object the stub is associated with may be stored and updated in a storage unit of the enterprise system. Thus, if the target object has been moved to another location in the computerized system, the stub will still point to the object.

Thus, a stub sent or otherwise delivered to a party of a device may eventually be used to remotely access in the computerized system the suitable object related to the outbound object. For example, the stub may by activated or triggered such as by clicking on or pointing to a visual representation thereof using a pointing device or keyboard or other input device, and consequently access to the object that the stub is directed to is attempted. Access to the object is governed by the security measures of the computerized system so that unauthorized access is denied. For example, a recipient of the communications may activate the stub, and in case the recipient is authorized to access or collaborate with the object then accessing the object is allowed, otherwise accessing by the recipient is denied.

It is noted that the stub may be distributed to a plurality of parties, such as by forwarding an email message with the stub as an attachment, and access to the object by any of the parties is governed by the security measures of the computerized system with respect to the object and the party activating the stub. Further, as the objects may be varied such as by modification and/or authorization thereof, an attempt to access an object by a party at a certain time may behave differently at another time or with respect to another party, according to rules or conditions that may be stored, e.g. along with the stub and associated metadata thereof.

FIG. 4B outlines operations 440 for accessing an object by a stub, according to exemplary embodiments of the disclosed subject matter.

In operation 412 an outbound object of a computerized apparatus linked to a computerized system having a storage is intercepted in and by the computerized apparatus, e.g., by an intercepting component. The outbound object is such as object 206, and the computerized system is such as computerized system 100 of enterprise system 110, disclosed above.

In operation 414, an instance of the object is identified in the storage of the computerized system. Identification of instance of the object may be performed by an identification module, which may be a stand-alone module, or may be incorporated within the intercepting component.

In operation 416, determination is made as to whether or not the instance of the object is stored in the storage of the computerized system. In case the instance of the object is not stored in the storage of the computerized system, then in operation 418 a copy of the object from the outgoing communication is saved in a suitable location in the storage of the computerized system. For example, storage-location rules may determine the designated locations for objects according to metadata data thereof, such as file names of the objects, dates and times the stubs of the respective objects were sent, or by date and time of the stubs or by classification of the objects, or by the location in which the non-updated object was stored, or by a temporary location, or by the sender of the outgoing communication including the stubs or the recipient of the stubs and/or by any other data such as by contents of the objects respective to the stubs.

In case that the instance of the object is stored in the storage of the computerized system, as well as following operation 418, in operation 420 a stub of the instance of the object is generated, with a link or a shortcut to a location of the identified instance of the object in the storage. The stub may include by an address or URL of the instance of the object, or a link or a shortcut to the instance of the object. The stub may be generated by a stubbing module, which may be a stand-alone module, or may be incorporated within the intercepting component.

In operation 422, the outbound object is replaced in the outgoing or outbound communication with the generated stub. In some embodiments, replacing the outbound object with the generated stub may be performed transparently of the sender of the outgoing communication and/or transparently of the recipient. In operation 424 the outgoing communication including the stub is sent to a recipient. Thus, instead of sending the outbound object, rather, the stub is sent to a recipient.

In operation 426, activation of the stub by the recipient is detected, e.g. by detecting an input such as a click of a mouse or keyboard device by the recipient on the representation of the stub. It is noted that the representation of the stub may be transparent to the recipient, for example the representation of the stub may appear like an original object attachment, rather than a stub or a link.

In operation 428, access by the recipient to the instance of the object is enabled via the stub, subject to suitable access rights of the recipient. That is, remote access to the instance of the object for collaboration under the supervision measures of the computerized system is enabled via the stub, if applicable. If the instance of the object was modified and/or moved to a different location (e.g., after the outgoing communication was sent and before the stub was activated by the recipient), information related to the object may be updated and stored, e.g. by a stubbing unit, or in a storage unit of the enterprise, and activating the stub by the recipient may automatically access the instance of the object or the moved object, according to the updated linkage data stored in the computerized system.

In some embodiments, the supervision measures of the computerized system may control access to objects, optionally particularly by communication such as a remote access, and thus may restrict access to objects to only by way of the stub and/or prevent direct access to objects. Likewise, the supervision measures of the computerized system may prevent access to other objects corresponding to the most up-to-date object or to objects related to the outbound object.

In some embodiments, the supervision measures of the computerized system, if applicable, may prevent and/or limit access to the object by the recipient, thus securing the access only for eligible recipients.

It is noted that the recipient may provide the stub to another recipient who may activate the provided stub for accessing storage of the computerized system, and the supervision measures of the computerized system, if applicable, are applied also to the other recipient, possibly with different protection or permissions applicable to the other recipient.

In some embodiments, a computerized method for managing a collaboration of objects via stubs, the method may include by a computerized apparatus linked to a computerized system, intercepting an outgoing communication including an object;

identifying an instance of the object in a storage of the computerized system;

generating a stub of the instance of the object, wherein the stub comprises a link or a shortcut to a location of the identified instance of the object in the storage of the computerized device;

replacing the object in the outgoing communication with the stub; and sending the outgoing communication including the stub to a recipient.

In some embodiments, if upon verifying that there is no instance of the object stored in the storage, the method may include saving a copy of the object in the outgoing communication to the storage of the computerized system and generating a stub specifying a location of the saved copy of the object in the storage of the computerized system.

In some embodiments, the method may include detecting an activation of the stub by the recipient, and enabling access by the recipient to the instance of the object in the storage of the computerized system if the recipient has access rights to access the object.

In some embodiments, the method may include logging the activation of the stub by the recipient.

In some embodiments, the computerized apparatus may include a communication interceptor. Intercepting the outgoing communication may include intercepting the outgoing communication using the communication interceptor.

In some embodiments, the communication interceptor may be selected from the group consisting of a network sniffer, a packet sniffer, a packet analyzer, a communication gateway, a router, a communication switch, a communication monitor, and a communication protocol analyzer.

In some embodiments, the computerized apparatus may include a server. Intercepting the outgoing communication may include intercepting the outgoing communication using the monitoring component implemented on the server.

In some embodiments, the server may be a mail server, a conferencing server, a chat server, an instant messaging server, or a peer-to-peer messaging server.

In some embodiments, the computerized apparatus may include a client device. Intercepting the outgoing communication may include intercepting the outgoing communication using a monitoring daemon implemented on the client device.

In some embodiments, intercepting the outgoing communication may include intercepting file-access events in the storage of the computerized system and matching the intercepted events to file-sending events.

In some embodiments, the method may include storing the stub in the storage of the computerized system.

In some embodiments, the method may include storing metadata associated with the object in the storage.

In some embodiments, a computerized system for managing a collaboration of objects via stubs may include a storage and a computerized apparatus. The computerized apparatus may be configured to intercept an outgoing communication including an object, to identify an instance of the object in a storage of the computerized system, to generate a stub of the instance of the object, wherein the stub comprises a link or a shortcut to a location of the identified instance of the object in the storage of the computerized device, to replace the object in the outgoing communication with the stub, and to send the outgoing communication including the stub to a recipient.

In some embodiments, if upon verifying that there is no instance of the object stored in the storage, the computerized apparatus may be configured to save a copy of the object in the outgoing communication to the storage and generating a stub specifying a location of the saved copy of the object in the storage.

In some embodiments, the computerized apparatus may be configured to detect an activation of the stub by the recipient, and to enable access by the recipient to the instance of the object in the storage if the recipient has access rights to access the object.

In some embodiments, the computerized apparatus may be configured to log the activation of the stub by the recipient.

In some embodiments, the computerized apparatus may include a communication interceptor for intercepting the outgoing communication.

In some embodiments, the communication interceptor may be selected from the group consisting of a network sniffer, a packet sniffer, a packet analyzer, a communication gateway, a router, a communication switch, a communication monitor, and a communication protocol analyzer.

In some embodiments, the computerized apparatus may include a server including a monitoring component configured to intercept the outgoing communication.

In some embodiments, the server may be selected from the group consisting of a mail server, a conferencing server, a chat server, an instant messaging server, and a peer-to-peer messaging server.

In some embodiments, the computerized apparatus may include a client device including a monitoring daemon configured to intercept the outgoing communication.

In some embodiments, the computerized apparatus may be configured to intercept the outgoing communication by intercepting file-access events in the storage and matching the intercepted events to file-sending events.

In some embodiments, the computerized apparatus may be configured to store the stub in the storage.

In some embodiments, the computerized apparatus may be configured to store metadata associated with the object in the storage.

Embodiments of the present disclosure is carried out by client computers devices that are linked therebetween by communications facilities.

The embodiments employ and practice mechanisms of identifying and matching objects such as files among a multitude of such elements that may be in the order of $10^5$-$10^6$ or higher.

It is noted that the mechanisms and operations as described above are complex and deal with numerous data elements that are apparently prohibitive for manual handling. Thus, evidently and clearly the mechanisms and operations are far beyond the capabilities of humans even when aided by pencil-and-paper or calculators. Therefore, the mechanisms and operations can only be carried out by machinery such as electronic processors using integrated and/or separate devices of memory, input/output and/or other functionalities such as communications, configured with software and/or dedicated hardware that is provided or programmed to perform the disclosed methods.

Further, considering expected accomplishments of the mechanisms and operations within a feasible short time of a few seconds or minutes—otherwise the whole scheme might be impractical for use such as unduly postponing transmissions—automatic implementation by a machine is clearly called for.

Consequently, undoubtedly the mechanisms and operations disclosed herein are inherently tied to a machine for the implementation thereof.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a program or a part thereof operating or interacting with one or more other parts of the system.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for managing a collaboration of objects via stubs, the method comprising:

in a computerized system comprised of one or more computers linked to a computerized apparatus, intercepting by said computerized apparatus an outgoing communication from the one or more computers to a recipient computer, wherein said recipient computer is outside of the computerized system;

analyzing the intercepted outgoing communication to determine if the outgoing communication comprises an attempt to send an object;

when the outgoing communication comprises an attempt to send an object, identifying an instance of the object in a storage of the computerized system;

generating a stub of the instance of the object, wherein the stub comprises a link or a shortcut to a location of the identified instance of the object in the storage of the computerized device;

replacing the object in the outgoing communication with the stub; and sending the outgoing communication including the stub to the recipient computer.

2. The method according to claim 1, further comprising if upon verifying that there is no instance of the object stored in the storage, saving a copy of the object in the outgoing communication to the storage of the computerized system and generating a stub specifying a location of the saved copy of the object in the storage of the computerized system.

3. The method according to claim 1, further comprising detecting an activation of the stub by the recipient, and enabling access by the recipient to the instance of the object in the storage of the computerized system if the recipient has access rights to access the object.

4. The method according to claim 3, further comprising logging the activation of the stub by the recipient.

5. The method according to claim 1, wherein the computerized apparatus includes a communication interceptor, and wherein intercepting the outgoing communication comprising intercepting the outgoing communication using the communication interceptor.

6. The method according to claim 5, wherein the communication interceptor is selected from the group consisting of a network sniffer, a packet sniffer, a packet analyzer, a communication gateway, a router, a communication switch, a communication monitor, and a communication protocol analyzer.

7. The method according to claim 1, wherein the computerized apparatus comprises a server, and wherein intercepting the outgoing communication comprising intercepting the outgoing communication using the monitoring component implemented on the server.

8. The method according to claim 7, wherein the server is a mail server, a conferencing server, a chat server, an instant messaging server, or a peer-to-peer messaging server.

9. The method according to claim 1, wherein the computerized apparatus comprises a client device, and wherein intercepting the outgoing communication comprising intercepting the outgoing communication using a monitoring daemon implemented on the client device.

10. The method according to claim 1, wherein intercepting the outgoing communication comprises intercepting file-access events in the storage of the computerized system and matching the intercepted events to file-sending events.

11. The method of claim 1, further comprising storing the stub in the storage of the computerized system.

12. The method of claim 1, further comprising storing metadata associated with the object in the storage.

13. A computerized system for managing a collaboration of objects via stubs, the system comprising:
a storage;
one or more computers linked to a computerized apparatus;
said computerized apparatus is configured to:
(i) intercept an outgoing communication from the one or more computers to a recipient computer, wherein said recipient computer is outside of the computerized system; and
(ii) analyze the intercepted outgoing communication to determine if the outgoing communication comprises an attempt to send an object;
when the outgoing communication comprises an attempt to send an object,
an identification module is configured to identify an instance of the object in a storage of the computerized system; and
a stubbing unit is configured to generate a stub of the instance of the object, wherein the stub comprises a link or a shortcut to a location of the identified instance of the object in the storage of the computerized device, to replace the object in the outgoing communication with the stub, and to send the outgoing communication including the stub to the recipient computer.

14. The system according to claim 13, wherein if upon verifying that there is no instance of the object stored in the storage, the computerized apparatus is configured to save a copy of the object in the outgoing communication to the storage and generating a stub specifying a location of the saved copy of the object in the storage.

15. The system according to claim 13, wherein the computerized apparatus is configured to detect an activation of the stub by the recipient, and to enable access by the recipient to the instance of the object in the storage if the recipient has access rights to access the object.

16. The system according to claim 15, wherein the computerized apparatus is configured to log the activation of the stub by the recipient.

17. The system according to claim 13, wherein the computerized apparatus comprises a communication interceptor for intercepting the outgoing communication.

18. The system according to claim 17, wherein the communication interceptor is selected from the group consisting of a network sniffer, a packet sniffer, a packet analyzer, a communication gateway, a router, a communication switch, a communication monitor, and a communication protocol analyzer.

19. The system according to claim 13, wherein the computerized apparatus comprises a server including a monitoring component configured to intercept the outgoing communication.

20. The system according to claim 19, wherein the server is selected from the group consisting of a mail server, a conferencing server, a chat server, an instant messaging server, and a peer-to-peer messaging server.

21. The system according to claim 13, wherein the computerized apparatus comprises a client device including a monitoring daemon configured to intercept the outgoing communication.

22. The system according to claim 13, wherein the computerized apparatus is configured to intercept the outgoing communication by intercepting file-access events in the storage and matching the intercepted events to file-sending events.

23. The system according to claim 13, wherein the computerized apparatus is configured to store the stub in the storage.

24. The system according to claim 13, wherein the computerized apparatus is configured to store metadata associated with the object in the storage.

* * * * *